United States Patent
Chi

(10) Patent No.: US 10,613,617 B2
(45) Date of Patent: Apr. 7, 2020

(54) SEMICONDUCTOR APPARATUS

(71) Applicant: SK hynix Inc., Icheon-si, Gyeonggi-do (KR)

(72) Inventor: Sung Soo Chi, Yongin-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 0 days.

(21) Appl. No.: 16/038,774

(22) Filed: Jul. 18, 2018

(65) Prior Publication Data

US 2019/0163253 A1 May 30, 2019

(30) Foreign Application Priority Data

Nov. 30, 2017 (KR) .................. 10-2017-0162988

(51) Int. Cl.
*G06F 1/32* (2019.01)
*G06F 1/3287* (2019.01)
*G05F 1/56* (2006.01)

(52) U.S. Cl.
CPC ............. *G06F 1/3287* (2013.01); *G05F 1/56* (2013.01)

(58) Field of Classification Search
CPC ................................ G06F 1/3287; G05F 1/56
USPC ........................................................ 327/365
See application file for complete search history.

(56) References Cited

U.S. PATENT DOCUMENTS

| | | | | |
|---|---|---|---|---|
| 7,023,757 B2* | 4/2006 | Watanabe | ............. | G06F 1/3203 365/227 |
| 7,418,612 B2* | 8/2008 | Do | ........... | G06F 1/3203 713/323 |
| 7,673,163 B2* | 3/2010 | Tsukimori | ............. | G06F 1/3203 713/300 |
| 8,055,924 B2* | 11/2011 | Koizumi | ............... | G06F 1/3203 713/324 |
| 9,443,564 B2* | 9/2016 | Ishizu | .................. | H01L 29/7869 |
| 10,088,886 B2* | 10/2018 | Tamura | .................. | G06F 1/3237 |
| 2013/0191673 A1* | 7/2013 | Koyama | ................... | G06F 1/26 713/324 |
| 2015/0269977 A1* | 9/2015 | Ishizu | .................... | G11C 5/147 365/154 |
| 2018/0210539 A1* | 7/2018 | Hashimoto | ........... | G06F 3/0625 |

FOREIGN PATENT DOCUMENTS

| | | |
|---|---|---|
| KR | 1020140095428 A | 8/2014 |
| KR | 1020150110343 A | 10/2015 |

* cited by examiner

*Primary Examiner* — Ryan Jager
(74) *Attorney, Agent, or Firm* — William Park & Associates Ltd.

(57) ABSTRACT

A semiconductor apparatus includes a state storage circuit configured to store information depending on a plurality of signals, and output the stored information as a power gating signal. The semiconductor apparatus may include a power gating circuit configured to provide or block a power supply voltage to an internal operation circuit as a driving voltage in response to the power gating signal.

13 Claims, 3 Drawing Sheets

SEMICONDUCTOR APPARATUS

CROSS-REFERENCES TO RELATED APPLICATION

The present application claims priority under 35 U.S.C. § 119(a) to Korean application number 10-2017-0162988, filed on Nov. 30, 2017, in the Korean Intellectual Property Office, which is incorporated herein by reference in its entirety.

BACKGROUND

1. Technical Field

Various embodiments generally relate to a semiconductor integrated circuit, and, more particularly, to a semiconductor apparatus.

2. Related Art

A semiconductor apparatus includes a number of circuits which are configured by transistors.

The semiconductor apparatus operates by being applied with power supply voltages from an exterior, and the circuits included therein also operate by being applied with power supply voltages.

Among a number of circuits included in the semiconductor apparatus, there is a circuit which is applied with power supply voltages and thereby consumes power even though it does not operate, which may cause a difficulty in reducing the power consumption of the semiconductor apparatus.

SUMMARY

In an embodiment, a semiconductor apparatus may be provided. The semiconductor apparatus may include a state storage circuit configured to store information depending on a plurality of signals, and output the stored information as a power gating signal. The semiconductor apparatus may include a power gating circuit configured to provide or block a power supply voltage to an internal operation circuit as a driving voltage in response to the power gating signal.

In an embodiment, a semiconductor apparatus may be provided. The semiconductor apparatus may include a plurality of internal integrated circuits each including a state storage circuit which stores information depending on a plurality of signals and outputs the stored information as a power gating signal and a power gating circuit which provides or blocks a power supply voltage to an internal operation circuit as a driving voltage depending on the power gating signal.

In an embodiment, a semiconductor apparatus may be provided. The semiconductor apparatus may include a state storage circuit configured to store information depending on a plurality of signals, and output the stored information as first and second power gating signals. The semiconductor apparatus may include a first switch configured to provide or block a first power supply voltage to an internal operation circuit as a first driving voltage in response to the first power gating signal. The semiconductor apparatus may include a second switch configured to provide or block a second power supply voltage to the internal operation circuit as a second driving voltage in response to the second power gating signal.

DETAILED DESCRIPTION

Hereinafter, a semiconductor apparatus will be described below with reference to the accompanying drawings through various examples of embodiments.

Various embodiments may be directed to a semiconductor apparatus capable of reducing power consumption.

The semiconductor apparatus according to the embodiments may provide advantages in the reduction of power consumption.

Figure 1:
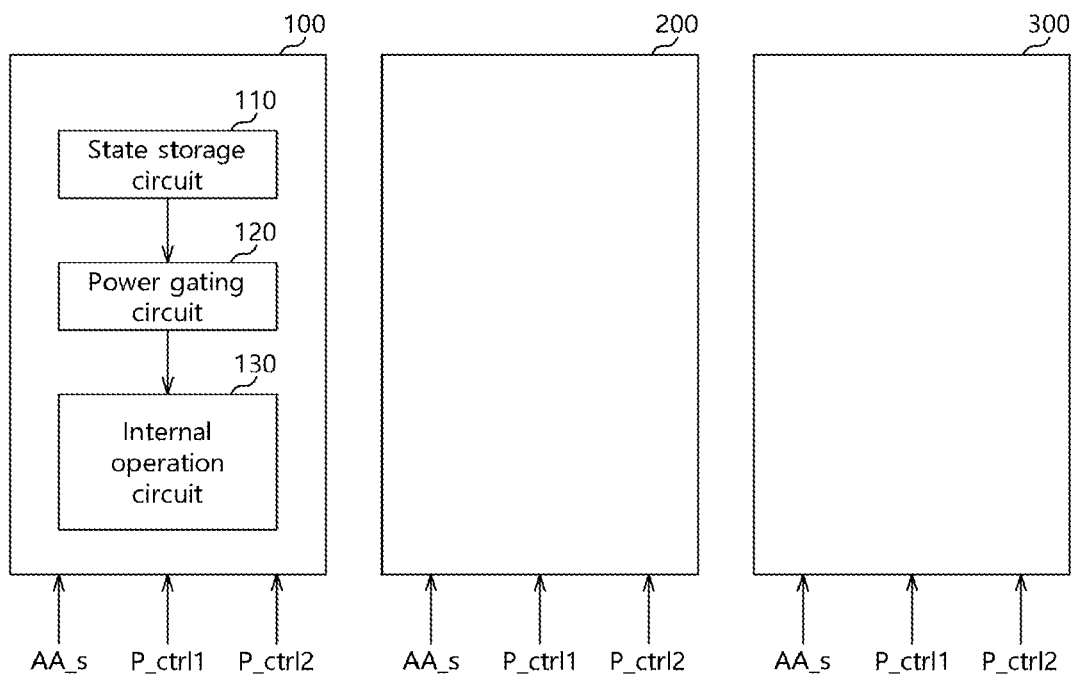
FIG. 1 is a configuration diagram illustrating a representation of an example of a semiconductor apparatus in accordance with an embodiment.

A semiconductor apparatus 1000 in accordance with an embodiment may include a plurality of internal integrated circuits 100, 200 and 300. In the semiconductor apparatus 1000 in accordance with an embodiment, while first to third internal integrated circuits 100, 200 and 300 are illustrated in FIG. 1, this is nothing but an example only, and it is to be noted that the number of internal integrated circuits is not specifically limited.

The first internal integrated circuit 100 may include a state storage circuit 110, a power gating circuit 120 and an internal operation circuit 130.

The state storage circuit 110 may store information on whether to activate the internal operation circuit 130, depending on the operation state of the semiconductor apparatus 1000 and an environment in which the semiconductor apparatus 1000 is mounted. For example, the state storage circuit 110 may store and output information on whether to activate the internal operation circuit 130, in response to an all active signal AA_s and first and second power control signals P_ctrl1 and P_ctrl2.

The power gating circuit 120 may provide or block power supply voltages to the internal operation circuit 130, in response to the output signal, that is, the stored information, of the state storage circuit 110.

The internal operation circuit 130 is activated by being applied with the power supply voltages which are provided from the power gating circuit 120.

The first internal integrated circuit 100 configured as mentioned above may provide or block the power supply voltages to the internal operation circuit 130, in response to the all active signal AA_s and the first and second power control signals P_ctrl1 and P_ctrl2.

Each of the second and third internal integrated circuits 200 and 300 may be configured in substantially the same manner as the first internal integrated circuit 100.

Therefore, while the components of each of the second and third internal integrated circuits 200 and 300 are not illustrated, the power supply voltages may be provided or blocked to an internal operation circuit which is included in each of the internal integrated circuits 200 and 300, in response to the all active signal AA_s and the first and second power control signals P_ctrl1 and P_ctrl2. If the all active signal AA_s is enabled, in the first to third internal integrated circuits 100, 200 and 300, the internal operation circuits respectively included in the first to third internal integrated circuits 100, 200 and 300 are provided with the power supply voltages. In the first internal integrated circuit 100, in the case where both the first and second power control signals P_ctrl1 and P_ctrl2 are high levels, the providing of the power supply voltages to the internal operation circuit 130 included in the first internal integrated circuit 100 may be blocked. In the second internal integrated circuit 200, in the case where the first power control signal P_ctrl1 is the high level and the second power control signal P_ctrl2 is a low level, the providing of the power supply voltages to the internal operation circuit included in the second internal integrated circuit 200 may be blocked. In the third internal integrated circuit 300, in the case where the first power control signal P_ctrl1 is a low level and the second power control signal P_ctrl2 is the high level, the providing of the power supply voltages to the internal operation circuit included in the third internal integrated circuit 300 may be blocked. While it is described that the first to third internal integrated circuits 100, 200 and 300 block the power supply voltages to the respective internal operation circuits in response to the first and second power control signals P_ctrl1 and P_ctrl2, it is to be noted that the numbers of the first to third internal integrated circuits 100, 200 and 300 to which the providing of the power supply voltages is simultaneously blocked by differentiating the combination of the first and second power control signals P_ctrl1 and P_ctrl2 and then inputting the combination to the first to third internal integrated circuits 100, 200 and 300 may be plural.

While a technology in which the first to third internal integrated circuits 100, 200 and 300 apply the power supply voltages to the respective internal operation circuits in response to the all active signal AA_s is disclosed in the present embodiments, it is to be noted that a change to a technology in which a plurality of internal integrated circuits apply the power supply voltages to respective internal operation circuits in response to the all active signal AA_s is nothing but a mere circuit change that may be easily derived by those skilled in the art. Also, while a technology in which the first to third internal integrated circuits 100, 200 and 300 block the power supply voltages to the respective internal operation circuits in response to the first and second power control signals P_ctrl1 and P_ctrl2 is disclosed in the present embodiments, it is to be noted that a change to a technology in which a plurality of internal integrated circuits block the power supply voltages to respective internal operation circuits in response to a plurality of power control signals is nothing but a mere circuit change that may be easily derived by those skilled in the art.

Figure 2:
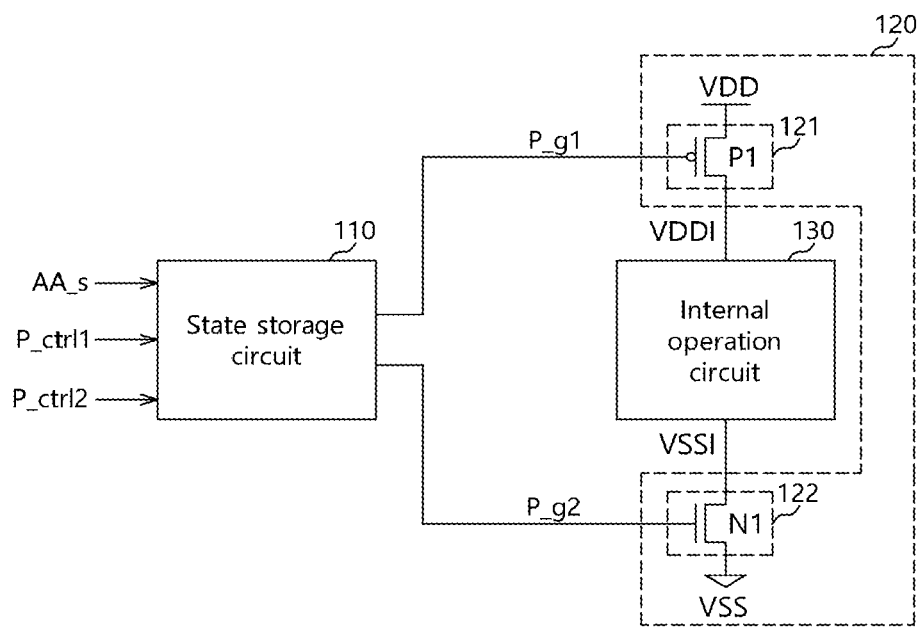
FIG. 2 is a configuration diagram illustrating a representation of an example of the internal integrated circuit shown in FIG. 1.

The components of a first internal integrated circuit 100 is illustrated in FIG. 2. The first internal integrated circuit 100 may be an example of an internal integrated circuit illustrated in FIG. 1. Referring to FIG. 2, the power supply voltages may include an external voltage VDD and a ground voltage VSS.

The state storage circuit 110 may generate first and second power gating signals P_g1 and P_g2 in response to the all active signal AA_s and the first and second power control signals P_ctrl1 and P_ctrl2. The first and second power gating signals P_g1 and P_g2 may be differential signals of different levels. For example, the state storage circuit 110 may output the first and second power gating signals P_g1 and P_g2 as signals of different levels in response to the all active signal AA_s and the first and second power control signals P_ctrl1 and P_ctrl2.

The power gating circuit 120 may provide or block the external voltage VDD and the ground voltage VSS to the internal operation circuit 130 as first and second driving voltages VDDI and VSSI, in response to the first and second power gating signals P_g1 and P_g2.

The power gating circuit 120 may include first and second switches 121 and 122.

The first switch 121 may provide or block the external voltage VDD to the internal operation circuit 130 as the first driving voltage VDDI, in response to the first power gating signal P_g1. For example, the first switch 121 may provide the external voltage VDD to the internal operation circuit 130 as the first driving voltage VDDI, when the first power gating signal P_g1 is disabled to a low level. The first switch 121 may block the external voltage VDD from being provided to the internal operation circuit 130 as the first driving voltage VDDI, when the first power gating signal P_g1 is enabled to a high level.

The first switch 121 may include a first transistor P1. The first transistor P1 has a gate which receives the first power gating signal P_g1, a source which is applied with the external voltage VDD and a drain to which the internal operation circuit 130 is coupled.

The second switch 122 may provide or block the ground voltage VSS to the internal operation circuit 130 as the second driving voltage VSSI, in response to the second power gating signal P_g2. For example, the second switch 122 may provide the ground voltage VSS to the internal operation circuit 130 as the second driving voltage VSSI, when the second power gating signal P_g2 is disabled to a high level. The second switch 122 may block the ground voltage VSS from being provided to the internal operation circuit 130 as the second driving voltage VSSI, when the second power gating signal P_g2 is enabled to a low level.

The second switch 122 may include a second transistor N1. The second transistor N1 has a gate which receives the second power gating signal P_g2, a drain to which the internal operation circuit 130-1 is coupled and a source to which the ground voltage VSS is applied.

The internal operation circuit 130 may operate by being activated through being provided with the first and second driving voltages VDDI and VSSI.

Figure 3:
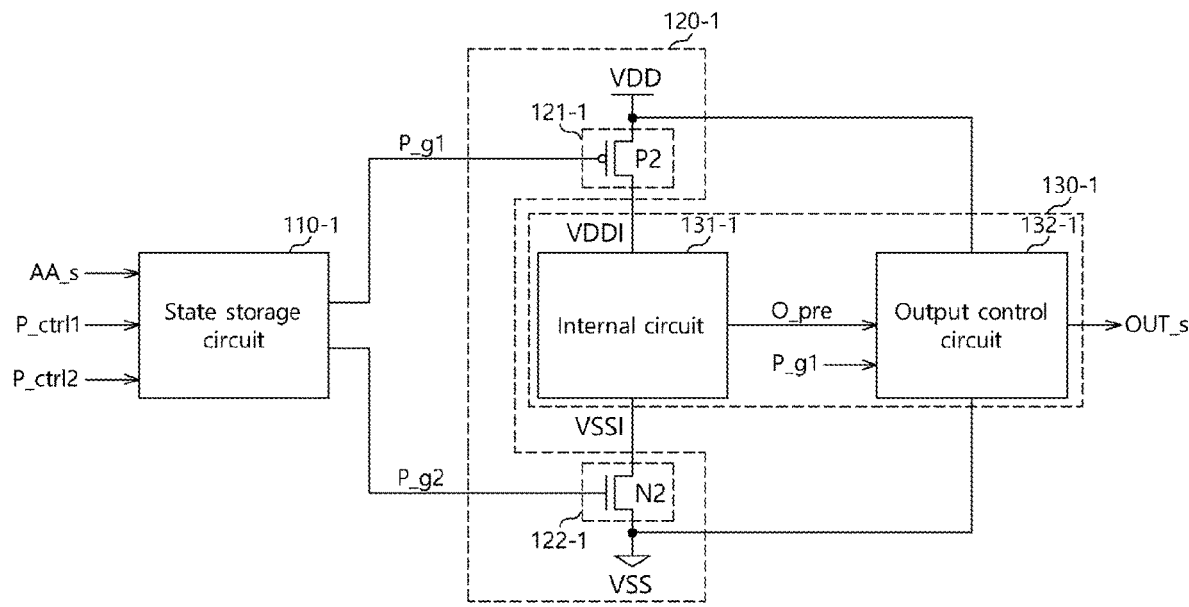
FIG. 3 is a configuration diagram illustrating a representation of an example of the internal integrated circuit shown in FIG. 1.

The first internal integrated circuit 100A in accordance with an embodiment may be as illustrated in FIG. 3 and may operate as follows.

Referring to FIG. 3, a state storage circuit 110-1 may generate first and second power gating signals P_g1 and P_g2 in response to the all active signal AA_s and the first and second power control signals P_ctrl1 and P_ctrl2. The first and second power gating signals P_g1 and P_g2 may be differential signals of different levels. For example, the state storage circuit 110-1 may output the first and second power gating signals P_g1 and P_g2 as signals of different levels in response to the all active signal AA_s and the first and second power control signals P_ctrl1 and P_ctrl2.

A power gating circuit 120-1 may provide or block the external voltage VDD and the ground voltage VSS to an internal circuit 131-1 of an internal operation circuit 130-1 as first and second driving voltages VDDI and VSSI, in response to the first and second power gating signals P_g1 and P_g2.

The power gating circuit 120-1 may include first and second switches 121-1 and 122-1.

The first switch 121-1 may provide or block the external voltage VDD to the internal operation circuit 130-1 as the first driving voltage VDDI, in response to the first power gating signal P_g1. For example, the first switch 121-1 may provide the external voltage VDD to the internal circuit 131-1 of the internal operation circuit 130-1 as the first driving voltage VDDI, when the first power gating signal P_g1 is disabled to a low level. The first switch 121-1 may block the external voltage VDD from being provided to the internal circuit 131-1 of the internal operation circuit 130-1 as the first driving voltage VDDI, when the first power gating signal P_g1 is enabled to a high level.

The first switch 121-1 may include a third transistor P2. The third transistor P2 has a gate which receives the first power gating signal P_g1, a source which is applied with the external voltage VDD and a drain to which the internal circuit 131-1 is coupled.

The second switch 122-1 may provide or block the ground voltage VSS to the internal circuit 131-1 of the internal operation circuit 130-1 as the second driving voltage VSSI, in response to the second power gating signal P_g2. For example, the second switch 122-1 may provide the ground voltage VSS to the internal circuit 131-1 of the internal operation circuit 130-1 as the second driving voltage VSSI, when the second power gating signal P_g2 is disabled to a high level. The second switch 122-1 may block the ground voltage VSS from being provided to the internal circuit 131-1 of the internal operation circuit 130-1 as the second driving voltage VSSI, when the second power gating signal P_g2 is enabled to a low level.

The second switch 122-1 may include a fourth transistor N2. The fourth transistor N2 has a gate which receives the second power gating signal P_g2, a drain to which the internal circuit 131-1 is coupled and a source to which the ground voltage VSS is applied.

The internal operation circuit 130-1 may include the internal circuit 131-1 and an output control circuit 132-1.

The internal circuit 131-1 may be activated by being provided with the first and second driving voltages VDDI and VSSI from the first and second switches 121-1 and 122-1, and may output a pre-output signal O_pre.

The output control circuit 132-1 may be provided with the external voltage VDD and the ground voltage VSS, and may output the pre-output signal O_pre as an output signal OUT_s or fix the output signal OUT_s to a specific level regardless of the pre-output signal O_pre, in response to the first power gating signal P_g1. For example, the output control circuit 132-1 may generate and output the output signal OUT_s depending on the pre-output signal O_pre in the case where the first power gating signal P_g1 is disabled. The output control circuit 132-1 may fix the output signal OUT_s to the specific level regardless of the pre-output signal O_pre in the case where the first power gating signal P_g1 is enabled.

Figure 4:
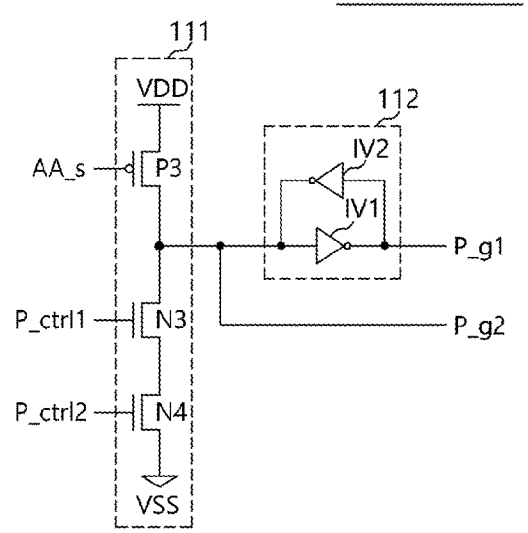
FIG. 4 is a configuration diagram illustrating a representation of an example of the state storage circuit shown in FIGS. 2 and 3.

As illustrated in FIG. 4, each of the state storage circuits 110 and 110-1 illustrated in FIGS. 1 to 3 may include a signal level setting circuit 111 and a storage circuit 112.

When the all active signal AA_s is enabled to a low level, the signal level setting circuit 111 disables the first power gating signal P_g1 to the low level and disables the second power gating signal P_g2 to the high level. In the case where both the first and second power control signals P_ctrl1 and P_ctrl2 are the high levels, the signal level setting circuit 111 enables the first power gating signal P_g1 to the high level and enables the second power gating signal P_g2 to the low level.

The signal level setting circuit 111 may include fifth to seventh transistors P3, N3 and N4. The fifth transistor P3 has a gate which receives the all active signal AA_s and a source which is applied with the external voltage VDD. The sixth transistor N3 has a gate which receives the first power control signal P_ctrl1 and a drain to which the drain of the fifth transistor P3 is coupled. The seventh transistor N4 has a gate which receives the second power control signal P_ctrl2, a drain to which the source of the sixth transistor N3 is coupled and a source which is applied with the ground voltage VSS. The second power gating signal P_g2 is outputted from a node where the fifth and sixth transistors P3 and N3 are coupled.

The storage circuit 112 may output the first power gating signal P_g1 by inverting the second power gating signal P_g2, and may latch and hold the levels of the first and second power gating signals P_g1 and P_g2.

The storage circuit 112 may include first and second inverters IV1 and IV2. The first inverter IV1 receives and inverts the second power gating signal P_g2, and outputs the first power gating signal P_g1. The second inverter IV2 receives and inverts the output signal of the first inverter IV1, and outputs the input signal of the first inverter IV1.

Figure 5:
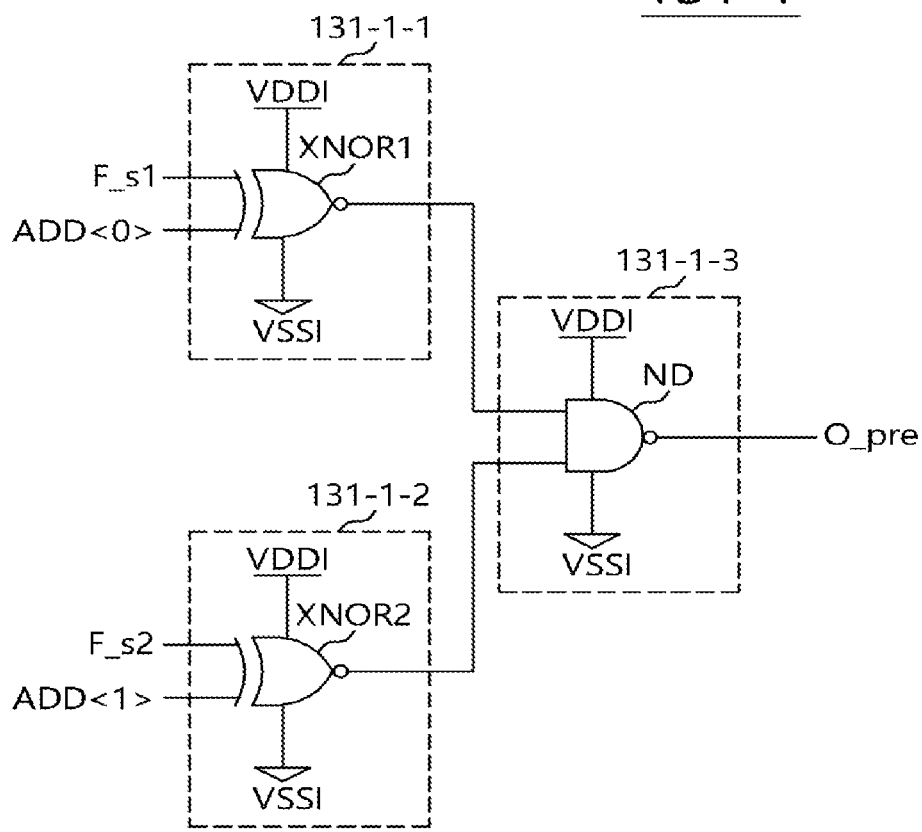
FIG. 5 is a configuration diagram illustrating a representation of an example of the internal circuit shown in FIG. 3.

As illustrated in FIG. 5, the internal circuit 131-1 of FIG. 3 may include first and second comparison circuits 131-1-1 and 131-1-2 and an output combination circuit 131-1-3. Each of the first and second comparison circuits 131-1-1 and 131-1-2 and the output combination circuit 131-1-3 which are included in the internal circuit 131-1 is a circuit which operates by being provided with the first and second driving voltages VDDI and VSSI. Therefore, the internal circuit 131-1 also operates by being provided with the first and second driving voltages VDDI and VSSI.

The first comparison circuit 131-1-1 may be a circuit which determines whether a first fuse signal F_s1 and a first address ADD<0> are the same level. For example, the first comparison circuit 131-1-1 may output an output signal of a high level when the first fuse signal F_s1 and the first address ADD<0> are the same level, and may output an output signal of a low level when the first fuse signal F_s1 and the first address ADD<0> are different levels.

The first comparison circuit 131-1-1 may perform an exclusive NOR operation. For example, the first comparison circuit 131-1-1 may include a first exclusive NOR gate XNOR1. The first exclusive NOR gate XNOR1 receives the first fuse signal F_s1 and the first address ADD<0>.

The second comparison circuit 131-1-2 may be a circuit which determines whether a second fuse signal F_s2 and a second address ADD<1> are the same level. For example, the second comparison circuit 131-1-2 may output an output signal of a high level when the second fuse signal F_s2 and the second address ADD<1> are the same level, and may output an output signal of a low level when the second fuse signal F_s2 and the second address ADD<1> are different levels.

The second comparison circuit 131-1-2 may perform an exclusive NOR operation. For example, the second comparison circuit 131-1-2 may include a second exclusive NOR gate XNOR2. The second exclusive NOR gate XNOR2 receives the second fuse signal F_s2 and the second address ADD<1>.

The output combination circuit 131-1-3 may generate the pre-output signal O_pre in response to the output signals of the first and second comparison circuits 131-1-1 and 131-

1-2. For example, the output combination circuit 131-1-3 may output the pre-output signal O_pre of a low level in the case where both the output signals of the first and second comparison circuits 131-1-1 and 131-1-2 are the high levels, and may output the pre-output signal O_pre of a high level in the case where both the output signals of the first and second comparison circuits 131-1-1 and 131-1-2 are not at the high levels.

The output combination circuit 131-1-3 may perform a NAND operation. For example, the output combination circuit 131-1-3 may include a NAND gate ND. The NAND gate ND receives the output signals of the first and second comparison circuits 131-1-1 and 131-1-2, and outputs the pre-output signal O_pre.

Figure 6:
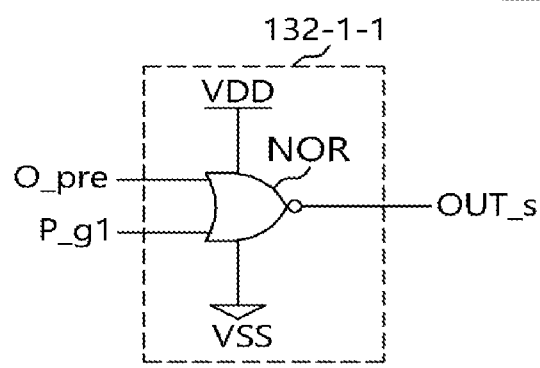
FIG. 6 is a configuration diagram illustrating a representation of an example of the output control circuit shown in FIG. 3.

FIGS. 5 and 6 illustrate the configurations of the internal circuit 131-1 and the output control circuit 132-1 as the components of the internal operation circuit 130-1 illustrated in FIG. 3, according to an embodiment. The internal circuit 131-1 as a component in accordance with an embodiment merely discloses a circuit which compares an address and a fuse signal, and it is to be noted that the embodiment is not limited thereto. Also, the internal circuit 131-1 disclosed in FIG. 5 merely represents an example of a circuit which is provided with the driving voltages VDDI and VSSI which are outputted from the power gating circuit 120-1, and the output control circuit 132-1 disclosed in FIG. 6 merely represents an example of a circuit which is applied with the power supply voltages VDD and VSS regardless of the driving voltages VDDI and VSSI which are outputted from the power gating circuit 120-1.

The internal circuit 131-1 illustrated in FIG. 5 merely discloses an example of a circuit which determines whether the first and second fuse signals F_s1 and F_s2 and the first and second addresses ADD<0:1> are the same levels, and it is not intended that the internal circuit 131-1 be limited to a circuit which compares a fuse signal and an address.

As illustrated in FIG. 6, the output control circuit 132-1 of FIG. 3 may include a logic circuit 132-1-1. The output control circuit 132-1 operates by being applied with the external voltage VDD and the ground voltage VSS.

The logic circuit 132-1-1 may receive the first power gating signal P_g1 and the pre-output signal O_pre and generate the output signal OUT_s. For example, the logic circuit 132-1-1 may generate the output signal OUT_s depending on the pre-output signal O_pre or fix the output signal OUT_s to a specific level regardless of the pre-output signal O_pre, in response to the first power gating signal P_g1. For example, the logic circuit 132-1-1 may output the output signal OUT_s by inverting the pre-output signal O_pre when the first power gating signal P_g1 is disabled to the low level, and outputs the output signal OUT_s by fixing it to a high level regardless of the pre-output signal O_pre when the first power gating signal P_g1 is enabled to the high level.

The logic circuit 132-1-1 may perform a NOR operation. For example, the logic circuit 132-1-1 may include a NOR gate NOR. The NOR gate NOR receives the pre-output signal O_pre and the first power gating signal P_g1 and outputs the output signal OUT_s. The logic circuit 132-1-1 operates by being applied with the external voltage VDD and the ground voltage VSS. Therefore, the NOR gate NOR also operates by being applied with the external voltage VDD and the ground voltage VSS.

The operation of the semiconductor apparatus 1000 in accordance with an embodiment, configured as mentioned above, will be described below.

As illustrated in FIG. 1, the semiconductor apparatus 1000 may include the first to third internal integrated circuits 100, 200 and 300.

The first internal integrated circuit 100 may include the state storage circuit 110, the power gating circuit 120 and the internal operation circuit 130. Each of the second and third internal integrated circuits 200 and 300 may include a state storage circuit, a power gating circuit and an internal operation circuit, in the same manner as the first internal integrated circuit 100.

In the first internal integrated circuit 100, the power gating circuit 120 may provide or block the power supply voltages to the internal operation circuit 130 depending on the information stored in the state storage circuit 110.

In each of the second and third internal integrated circuits 200 and 300, in the same manner as the first internal integrated circuit 100, the power gating circuit may provide or block the power supply voltages to the internal operation circuit depending on the information stored in the state storage circuit.

Each of the first to third internal integrated circuits 100, 200 and 300 may set the information stored in the state storage circuit in response to the all active signal AA_s and the first and second power control signals P_ctrl1 and P_ctrl2.

For example, if the all active signal AA_s is enabled, in the first to third internal integrated circuits 100, 200 and 300, multiple information for causing the power supply voltages to be provided to the internal operation circuits respectively included in the first to third internal integrated circuits 100, 200 and 300 is stored in the respective state storage circuits. In the first internal integrated circuit 100, in the case where both the first and second power control signals P_ctrl1 and P_ctrl2 are the high levels, information for causing the power supply voltages to be provided to the internal operation circuit 130 is stored in the state storage circuit 110. In the second internal integrated circuit 200, in the case where the first power control signal P_ctrl1 is the high level and the second power control signal P_ctrl2 is the low level, information for causing the power supply voltages to be provided to the internal operation circuit is stored in the state storage circuit. In the third internal integrated circuit 300, in the case where the first power control signal P_ctrl1 is the low level and the second power control signal P_ctrl2 is the high level, information for causing the power supply voltages to be provided to the internal operation circuit is stored in the state storage circuit.

The semiconductor apparatus in accordance with an embodiment includes a plurality of internal integrated circuits, and, in each of the internal integrated circuits, power supply voltages are provided or blocked by using a power gating circuit. As a consequence, it may be possible to eliminate leakage current which likely to occur due to the power supply voltages provided to internal operation circuits which are not used.

Each of the internal integrated circuits included in the semiconductor apparatus in accordance with an embodiment may be configured as illustrated in FIG. 2 or 3.

In the internal integrated circuit 100 illustrated in FIG. 2, it is disclosed that the external voltage VDD and the ground voltage VSS are provided or blocked to the internal operation circuit 130 by using the power gating circuit 120 depending on the information P_g1 and P_g2 stored in the state storage circuit 110.

If the external voltage VDD and the ground voltage VSS are blocked from being provided to the entire internal operation circuit 130 illustrated in FIG. 2, all the nodes of the internal operation circuit 130 are floated. In particular, if the output terminal of the internal operation circuit 130 is floated, the malfunction of another internal operation circuit which receives the output of the internal operation circuit 130 may be caused.

The internal operation circuit 130-1 illustrated in FIG. 3 is divided into the internal circuit 131-1 to which the external voltage VDD and the ground voltage VSS are provided or blocked by the power gating circuit 120-1 and the output control circuit 132-1 which is always provided with the external voltage VDD and the ground voltage VSS. Therefore, even though the external voltage VDD and the ground voltage VSS are not provided to the internal circuit 131-1, the signal outputted from the output control circuit 132-1 may be fixed to a specific level, whereby it may be possible to prevent a malfunction from occurring.

While various embodiments have been described above, it will be understood to those skilled in the art that the embodiments described are examples only. Accordingly, the semiconductor apparatus described herein should not be limited based on the described embodiments.

What is claimed is:

1. A semiconductor apparatus comprising:
   a state storage circuit configured to store information depending on a plurality of signals, and output the stored information as a power gating signal; and
   a power gating circuit configured to provide or block a power supply voltage to an internal operation circuit as a driving voltage in response to the power gating signal,
   wherein the internal operation circuit comprises an internal circuit and an output control circuit,
   wherein the internal circuit operates by being provided with the driving voltage provided from the power gating circuit, and
   wherein the output control circuit operates by being provided with the power supply voltage.

2. The semiconductor apparatus according to claim 1, wherein the plurality of signals include an all active signal, a first power control signal and a second power control signal, and
   wherein the state storage circuit disables the power gating signal when the all active signal is enabled, and enables the power gating signal in response to the first and second power control signals.

3. The semiconductor apparatus according to claim 2, wherein the state storage circuit comprises:
   a signal level setting circuit configured to disable the power gating signal when the all active signal is enabled, and enable the power gating signal in response to the first and second power control signals; and
   a storage circuit configured to hold and output a level of the power gating signal.

4. The semiconductor apparatus according to claim 1, wherein the power gating circuit comprises:
   a switch configured to provide the power supply voltage to the internal operation circuit when the power gating signal is disabled, and block the power supply voltage from being provided to the internal operation circuit when the power gating signal is enabled.

5. The semiconductor apparatus according to claim 1, wherein the output control circuit generates and outputs an output signal depending on a pre-output signal which is outputted from the internal circuit or fixes the output signal to a specific level regardless of the pre-output signal, in response to the power gating signal.

6. The semiconductor apparatus according to claim 1, wherein the information includes whether to activate the internal operation circuit, depending on an operation state of the semiconductor apparatus.

7. A semiconductor apparatus comprising:
   a plurality of internal integrated circuits each including:
   a state storage circuit which stores information depending on a plurality of signals and outputs the stored information as a power gating signal, and
   a power gating circuit which provides or blocks a power supply voltage to an internal operation circuit as a driving voltage depending on the power gating signal,
   wherein the plurality of signals include an all active signal, a first power control signal and a second power control signal,
   wherein the plurality of internal integrated circuits include a first internal integrated circuit and a second internal integrated circuit, and
   wherein, when the all active signal is enabled, each of the first and second internal integrated circuits provides the power supply voltage to the internal operation circuit included in each internal integrated circuit, as the driving voltage.

8. The semiconductor apparatus according to claim 7, wherein a combination of the first and second power control signals by which the driving voltage is blocked from being provided to the internal operation circuit included in the first internal integrated circuit and a combination of the first and second power control signals by which the driving voltage is blocked from being provided to the internal operation circuit included in the second internal integrated circuit are different from each other.

9. The semiconductor apparatus according to claim 7, wherein the internal operation circuit comprises:
   an internal circuit configured to operate by being applied with the driving voltage; and
   an output control circuit configured to operate by being applied with the power supply voltage.

10. The semiconductor apparatus according to claim 9, wherein, when the driving voltage is blocked from being provided to the internal circuit in response to the power gating signal, the output control circuit fixes an output signal of the output control circuit to a specific level regardless of an output signal of the internal circuit, and
    wherein, when the driving voltage is provided to the internal circuit in response to the power gating signal, the output control circuit generates and outputs an output signal of the output control circuit depending on an output signal of the internal circuit.

11. A semiconductor apparatus comprising:
    a state storage circuit configured to store information depending on a plurality of signals, and output the stored information as first and second power gating signals; and
    a first switch configured to provide or block a first power supply voltage to an internal operation circuit as a first driving voltage in response to the first power gating signal; and
    a second switch configured to provide or block a second power supply voltage to the internal operation circuit as a second driving voltage in response to the second power gating signal,
    wherein the plurality of signals include an all active signal, a first power control signal and a second power control signal,
    wherein the state storage circuit disables the power gating signal when the all active signal is enabled, and enables the power gating signal in response to the first and second power control signals, wherein the internal operation circuit comprises an internal circuit and an output control circuit, wherein the internal circuit operates by being provided with the driving voltage provided from the power gating circuit, and wherein the output control circuit operates by being provided with the power supply voltage.

12. The semiconductor apparatus according to claim 11, wherein the first power supply voltage is greater than the second power supply voltage.

13. The semiconductor apparatus according to claim 11, wherein the second power supply voltage is blocked when the second power gating signal is disabled, and is provided when the second power gating signal is enabled, and wherein the first power supply voltage is blocked when the first power gating signal is disabled, and is provided when the first power gating signal is enabled.

* * * * *